United States Patent [19]

Labbe et al.

[11] Patent Number: 5,181,482
[45] Date of Patent: Jan. 26, 1993

[54] SOOTBLOWING ADVISOR AND AUTOMATION SYSTEM

[75] Inventors: Donald E. Labbe, Woburn, Mass.; Lawrence J. Line, Davis, W. Va.; Christopher T. Geary, Sudbury, Mass.; Mark C. Leigh, Richmond, Va.; John M. Donohue, Malden, Mass.

[73] Assignee: Stone & Webster Engineering Corp., Boston, Mass.; a part interest

[21] Appl. No.: 807,445

[22] Filed: Dec. 13, 1991

[51] Int. Cl.⁵ ............................................ F22B 37/52
[52] U.S. Cl. .................................. 122/392; 15/318.1; 122/379; 364/551.01
[58] Field of Search ............... 122/379, 390, 392, 449; 73/112; 364/551.01; 15/318.1

[56] References Cited

U.S. PATENT DOCUMENTS

| | | | |
|---|---|---|---|
| 4,085,438 | 4/1978 | Butler | 15/318.1 X |
| 4,454,840 | 6/1984 | Dziubakowski | |
| 4,466,383 | 8/1984 | Klatt et al. | 122/379 |
| 4,475,482 | 10/1984 | Moss et al. | 122/379 |
| 4,539,840 | 9/1985 | Klatt et al. | 73/112 |
| 4,718,376 | 1/1988 | Leroueil et al. | |
| 4,941,113 | 7/1990 | Dundics et al. | 364/551.01 |
| 5,027,751 | 7/1991 | Archer et al. | 122/390 X |

OTHER PUBLICATIONS

D. Labbe and M. Leigh; A Plant Controls Retrofit Using a DCS; Sep 9, 1990; St. Louis, Mo.
D. Labbe, J. Donohue and L. Line; Advanced Controls Help Cycling Plants Copy With Increased Stress; Dec. 4, 1990; Washington, D.C.

Primary Examiner—Edward G. Favors
Attorney, Agent, or Firm—Hedman, Gibson & Costigan

[57] ABSTRACT

A method and system for controlling and providing guidance in sootblowing based on continuous plant monitoring and model calculations. The continuous monitoring of plant conditions is through a plant distributed control system (DCS) which communicates with a computer. The conventional measurements of a DCS such as flow, pressure and temperature and sootblower status data are input into the computer. These valves are validated for accuracy. To predict the effects of fouling a plant model is utilized. The model predicts the rate and effect of fouling on energy distribution in the boiler. The model then predicts the effect that sootblowing of each section will have on the boiler performance. A comparison of the predicted and observed effects are used to update the fouling model and maintain consistency with the actual performance of the boiler. This information is presented to the boiler operator to assist in enhancing the boiler efficiency and maintain steam temperatures within established control ranges.

19 Claims, 4 Drawing Sheets

Microfiche Appendix Included
(233 Microfiche, 3 Pages)

SOOTBLOWING ADVISOR AND AUTOMATION SYSTEM

A Microfiche Appendix is Attached. The Appendix is Comprised of 3 Microfiche Sheets and a Total of 233 Frames.

FIELD OF THE INVENTION

The present invention relates to a system that controls cycle efficiency by identifying the system variable that can be implemented to most beneficially improve the system. More specifically, the present invention relates to a boiler-steam turbine-generator system control that relies on selective implementation of sootblowers.

BACKGROUND OF THE INVENTION

Typically, a boiler is comprised of a steam side and a combustion gas side. As fuel is combusted, steam flowing through the boiler tubes is heated by the combustion gases for service use, such as driving a steam turbine. Conventional boiler-steam turbine systems also comprise superheater, reheater and economizer sections to fully use the heat of the combustion gases. Thus, the combustion gases travel over several heat transfer surfaces before discharging through the furnace stack.

The combustion of coal in a boiler furnace generates large quantities of ash and soot in the combustion gases, a portion of which deposits on the heat transfer surfaces of the furnace system. As the layer of soot builds, the heat transfer rate from the hot gas to the steam side is reduced. To remove the soot a jet of air or steam is directed by a sootblower to clean a local area. Many sootblowers are installed throughout a furnace. Although the fouling of the furnace is a gradual process, sootblowing results in an abrupt change in local heat transfer and in the distribution of energy to the steam side components in a furnace. The former can cause transients in steam temperature as the control system responds to the disturbance. The latter can cause a loss of performance by driving steam temperatures below the range of control and reducing the achievable steam temperatures thereby resulting in an unfavorable energy distribution that can lead to a loss of thermal performance. Also, since sootblowers use pressurized air or steam, excessive sootblowing wastes energy. Further, the activation of certain sootblowers that have little effect on performance results in ineffective use of energy.

Large numbers of sootblowers and continuous changing unit conditions make it difficult for an operator to determine which sootblower to activate and when. Operators typically have resorted to a time basis for the selection of sootblower operation. As a result, unfavorable furnace energy distributions frequently develop, which leads to a loss of performance. One indication of poor distribution is the inability to achieve temperature set point with reheat steam. Reheat steam temperature controls simply are not able to raise steam temperatures to the set point due to excessive fouling of the reheat sections.

Additionally, an abrupt change in heat transfer due to sootblowing often results in large transients in steam temperatures that challenge a steam temperature control system. A conventional steam temperature control system does not anticipate the impact of sootblowing on steam temperature. Therefore, the control system relies solely on feedback action to respond to the effect of sootblowing. This results in significant deviations from set point for several temperature cycles as steam temperatures gradually return to set point or to the limit of the control range.

To help decrease these changes, recently many power plants have begun to upgrade and retrofit their locations to improve the controls. Performance history has established that poor control is a primary contributor to plant trips and premature equipment failures. To gain more control, many utilities have installed a distributed control system (DCS). However, an upgrade to new control hardware alone does not resolve the plant control problems. Control logic must also be used to achieve and enhance control improvement especially in light of the complexity of modern power plants, the highly interactive nature of the process and the large number of controllable parameters.

SUMMARY OF THE INVENTION

It is an objective of the present invention to provide a model based optimization program which predicts the effects of sootblowing on unit performance. The designated function of the program is to predict the optimum sootblower sequence based on the criteria of unit heat rate, and superheat and reheat steam temperature control.

The program uses as inputs conventional measurements of flow, pressure, temperature and valve positions in addition to sootblower status data. This information is received from standard sensors located throughout a plant which are used in a distributed control system (DCS). Thus there is no need for additional sensors.

To quantify the effects of sootblowing on unit performance, the gradual fouling of the furnace and sootblower cleaning effects are incorporated into a plant simulation model. The simulation model predicts the characteristics of sootblowing observed at each sootblower section. Periodically, the elapsed time from the last sootblowing of each sootblower is fed to the model along with the temperatures, pressures, mass flows and generator output. The model uses the information to provide a frame of reference that is the current status of the system. Thereafter, the model predicts the effects on the system of sootblowing each of the sootblower sections. The relative effect of blowing each sootblower section is displayed and a decision of which sootblower, if any, to blow is made.

BRIEF DESCRIPTION OF THE DRAWINGS

The present invention will be better understood when considered with the accompanying drawings wherein.

DETAILED DESCRIPTION OF THE INVENTION

The present invention applies to situations in which a boiler operator must determine if and which sootblower should be implemented to maintain the efficiency of the cycle. To implement such a system, plant control values are passed via a distributed control system (DCS) to a computing device which then processes the information by a model based optimization program, also referred to as the sootblower advisor. Each boiler has unique features that distinguish it from other boilers. The unique features of a boiler are related to the numerous types of sootblowers a boiler may have and the location of the sootblowers. The first step in determining which sootblower is most efficient to clean is to group the sootblowers into various sections based on their location in the boiler. These sections are then organized into groups. In organizing the sootblowers into groups, each group only includes that portion of the boiler which has similar specific deposit formation characteristics and a group should only include sootblowers which cover the boiler monitored with a given set of sensors.

Figure 1:
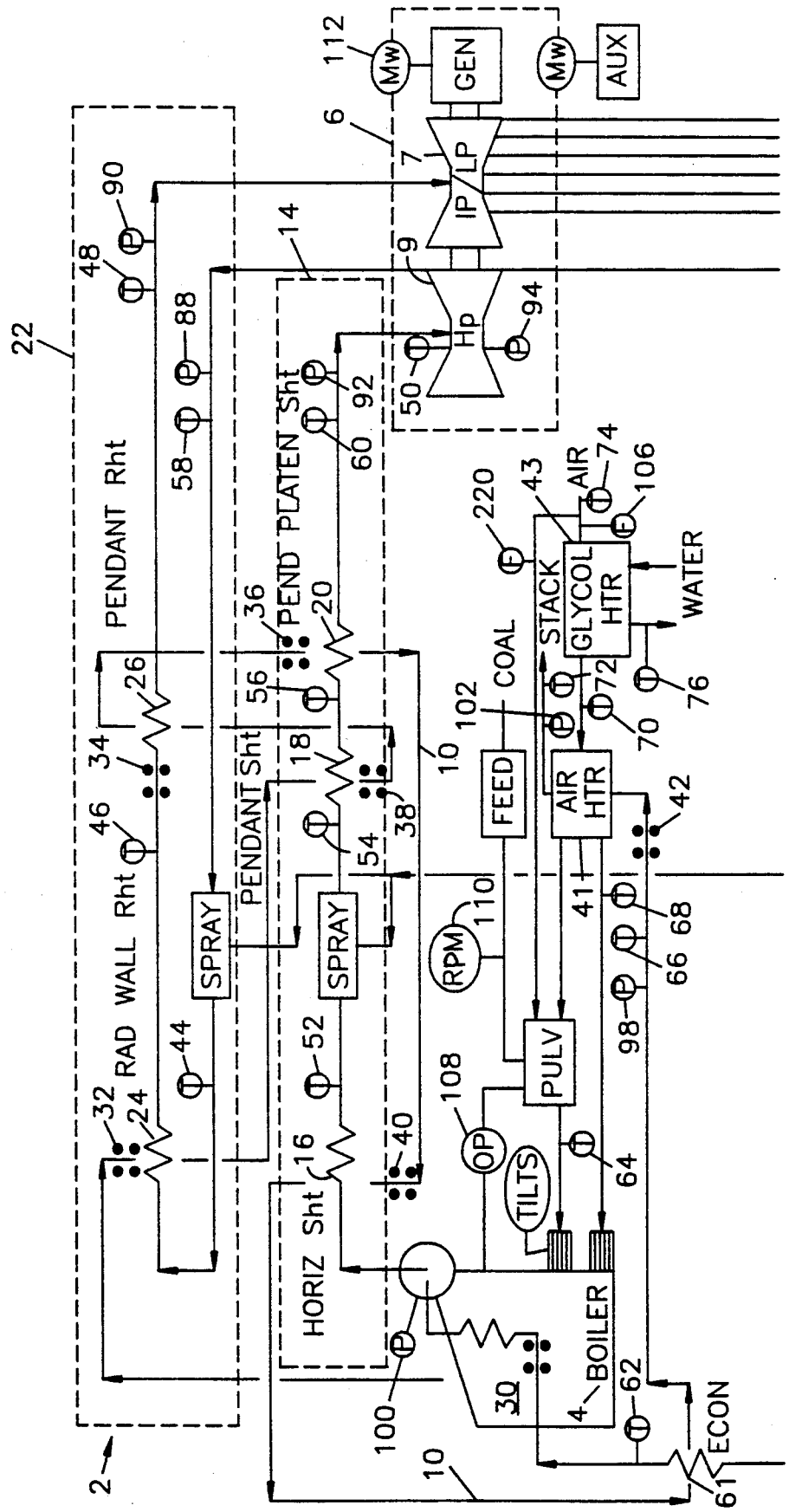
FIG. 1 is a schematic of an overall boiler-turbine system.

The present invention will be described in the environment of a coal fired boiler-steam turbine-electric generator system 2. As best seen in FIG. 1 the system 2 is comprised of a boiler 4, a turbine-generator assembly 6 and a condenser-feed water heater system 8.

The boiler 4 comprises a steam side and a combustion gas side 10. The steam side is provided with a multi-stage superheater system 14 comprised of a horizontal superheater 16, a pendent superheater 18 and a pendent platen superheater 20 arranged in series. In addition, a reheater system 22 having a radiant wall reheater 24 and a pendent reheater 26 in series extends through the boiler 4.

Sootblowers are arranged in the combustion gas side 10 at strategic locations to clean the soot from the various heat transfer surfaces. As shown illustratively in FIG. 1, an array of water wall sootblowers 30 is located upstream and in the area of the boiler tubes, an array of radiant reheat sootblowers 32 is located upstream and in the area of the radiant reheater 24, an array of convective reheat sootblowers 34 is located upstream and in the area of the pendent reheater 26, an array of pendent platen superheater sootblowers 36 is located upstream and in the area of the pendent platen superheater 20, an array of pendent superheater sootblowers 38 is located upstream and in the area of the pendent superheater 18, an array of superheater sootblowers 40 is located upstream and in the area of the superheater 16 and an array of air preheater sootblowers 42 is located upstream in the area of the air preheater 41.

Sensors to measure the temperature, pressure, flow and performance are also shown in FIG. 1. Temperature sensors 44, 46, 48, 50, 52, 54, 56, 58, 60, 62, 64, 66, 68, 70, 72, 74, 76, 78, 80, 82, 84, 86 and 206 are strategically located in the system. Pressure sensors 88, 90, 92, 94, 96, 98, 100, 102, 200 and 202 and flow sensors 104, 106, 108, 110, 204, 210 and 220 are located strategically in the system. A generated power sensor 112 measures the megawatts generated by the system generator.

Figure 2:
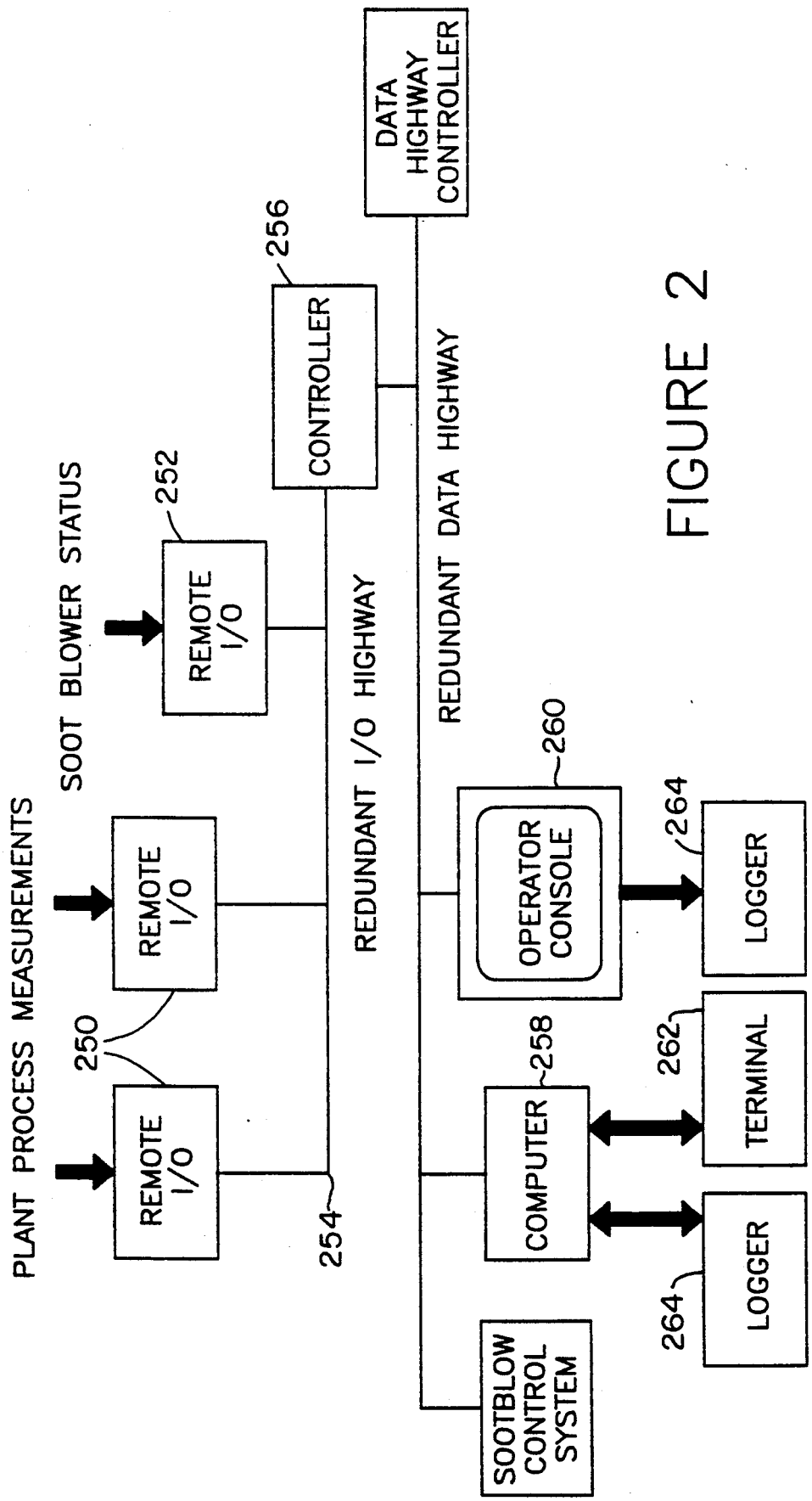
FIG. 2 is a schematic of the general hardware configuration used to implement the invention.

As seen in FIG. 2 the distributed control system hardware configuration is comprised basically of conventional remote input-output registers 250 that receive data from the system sensors, a sootblower status input-output register 252, an input-output highway 254, a controller 256, a computer 258 and an operator console 260. The computer 258 interfaces with a terminal 262 and is provided with a logger 264 that is also in communication with the operator console 260.

Figure 3:
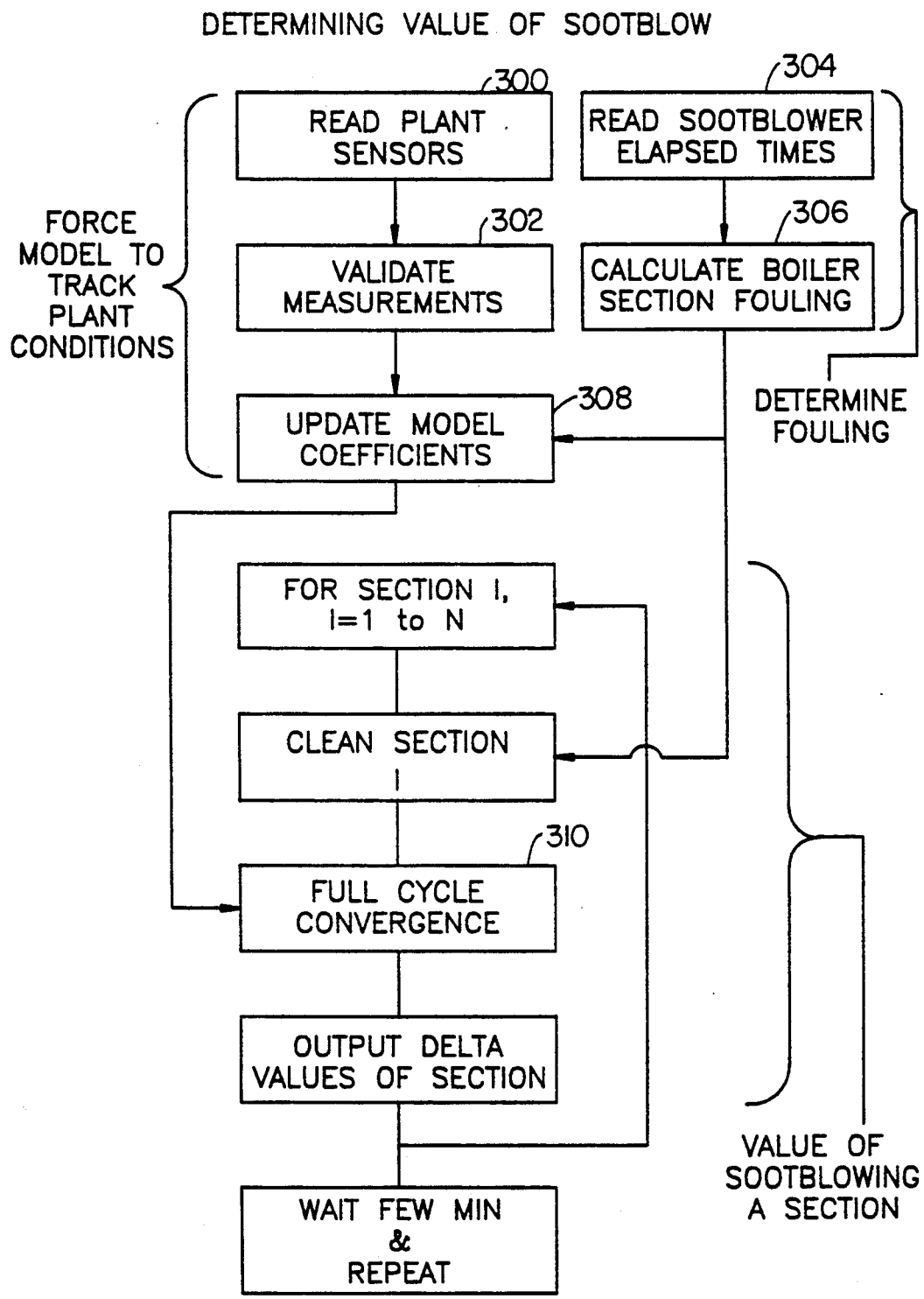
FIG. 3 is a block diagram for determining the value of sootblowing each sootblower section.
Figure 4:
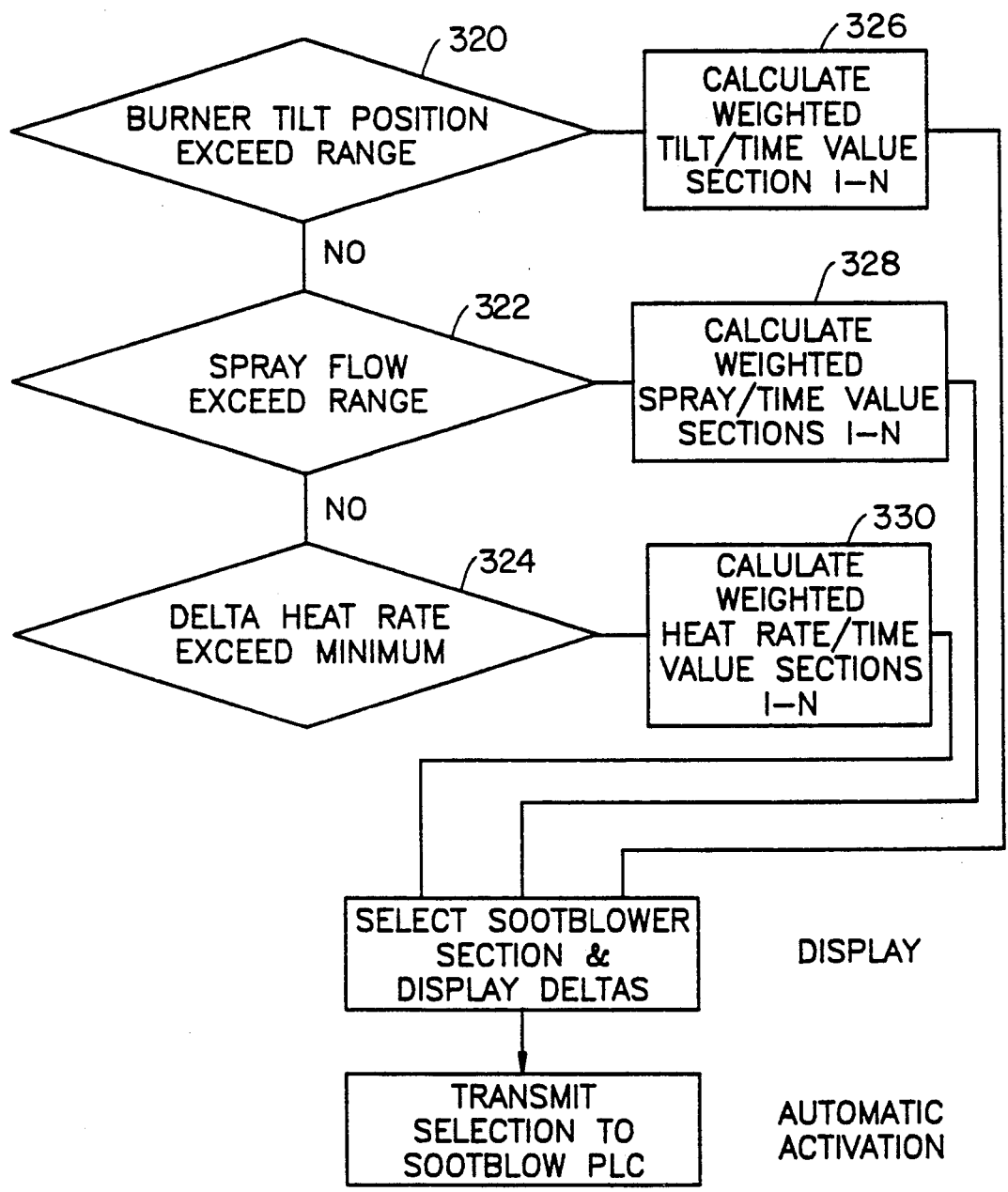
FIG. 4 is a block diagram of the criteria for sootblower selection.
Figure 1:
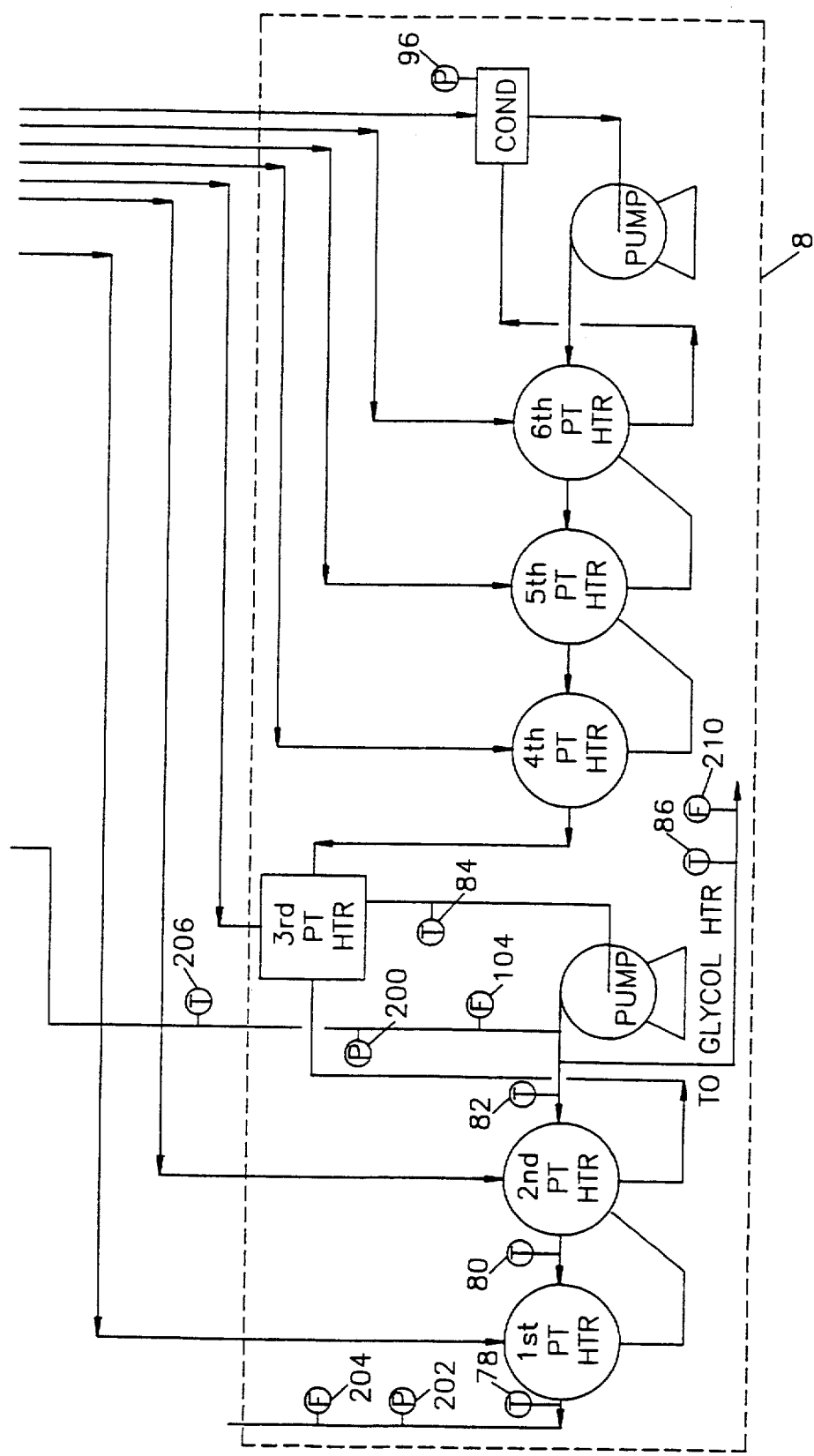

Functionally, the system determines the value of sootblowing and the criteria for sootblowing selection as shown in the flow charts of FIGS. 3 and 4.

As shown in FIG. 3, the process is essentially performed in the computer 258 and proceeds by first obtaining raw data from the sensors 300, analyzing the data to provide a current status condition and validating the raw data 302. Simultaneously the respective sootblowers elapsed times are read 304 and the boiler section fouling is calculated 306. The validated measurements and the respective boiler section fouling are combined to update the model coefficients 308. Thereafter, a sequencing analysis is performed identified as full cycle convergence 310 to determine which of the sootblower sections, if any, will produce the most beneficial effect on the overall cycle by blowing. A final step is performed of converting the model information on the prospective result of sootblowing the respective sections into relative digital data to facilitate display in bar graph form on the console screen.

The criteria for selecting the particular sootblower section to blow after the data has been displayed proceeds as shown in FIG. 4 by evaluating the ability to regulate reheat steam temperature within the desired control range, in this case the burner tilt position 320, the boiler spray rates 322 and the change in heat rate 324 by calculating the weighted tilt/time values of each section 326, calculating the weighted spray/time values 328 and calculating the weighted heat rate/time values 330 that will be produced by blowing the respective sootblower section and thus enabling proper evaluation of the sootblower section, if any, that will produce the most beneficial effect on the overall plant cycle.

The model within the computer 258 has been developed from actual cycle performance. The model simulates the actual conditions existing through the cycle. Included in the program are relative weighted values for individual sootblowers and for entire sootblower sections. Certain individual sootblowers due to location and capacity, will blow more soot than other sootblowers. Similarly, certain sections of sootblowers will provide more soot removal than other sections.

Fouling rates for groups of sootblowers and the maximum fouling fraction of a group are also present in the model.

In addition, sootblower criteria values and delta total weighing factors are included in the program. The criteria values are upper and lower limits for burner tilt position and superheater spray flow and upper limits for heat rate. The delta weighing factors are the weight given to burner tilt position, superheater spray flow, heat rate and elapsed time.

An illustration of the sootblower advisor in operation follows.

The ninety five individual sootblowers are placed in twenty five sections. The twenty five sootblower sections are organized into twelve groups as follows:

1. A side waterwall—Sections (rows) 1A, 2AO, 2AE, 3A and half of 4
2. B side waterwall—Sections (rows) 1B, 2BO, 2BE, 3B and half of 4
3. A side radiant reheat—Sections 3ARH, 4ARH
4. B side radiant reheat—Sections 3BRH, 4BRH
5. A side convective reheat—IK-3(%), IK-5(5A), IK-7
6. B side convective reheat—IK-4(%), IK-6(6A), IK-8
7. A side pendant superheat—IK-1, IK-3(%)
8. B side pendant superheat—IK-2, IK-4(%)
9. A side final superheat—IK-9
10. B side final superheat—IK-10
11. A side air preheater—IK-A
12. B side air preheater—IK-B note: IK-3 and IK-4 duty split between reheat and superheat The analysis performed at the particular time evaluated the sootblowing effect based on the following conditions.

| SOOTBLOWER ELAPSED TIME (HRS.) VALUES OF EACH OF THE NINETY FIVE SOOTBLOWERS ||||||||||
|---|---|---|---|---|---|---|---|---|---|
| 30.05 | 30.00 | 30.00 | 29.99 | 29.98 | 29.95 | 29.95 | 29.94 | 29.93 | 29.91 |
| 29.90 | 24.74 | 24.73 | 24.72 | 27.71 | 24.69 | 24.69 | 24.68 | 24.62 | 24.61 |
| 0.00 | 24.60 | 11.88 | 11.85 | 11.83 | 19.22 | 0.00 | 0.00 | 0.07 | 0.06 |
| 0.02 | 0.00 | 0.00 | 16.97 | 16.96 | 16.92 | 14.34 | 14.33 | 0.17 | 0.00 |
| 0.12 | 0.00 | 0.00 | 14.23 | 0.00 | 10.74 | 10.71 | 10.71 | 10.70 | 10.70 |
| 10.67 | 10.66 | 10.82 | 10.82 | 10.81 | 10.80 | 0.00 | 10.77 | 0.00 | 18.72 |
| 18.71 | 18.71 | 0.00 | 0.00 | 0.00 | 1.22 | 1.22 | 1.21 | 0.00 | 1.17 |
| 1.16 | 1.16 | 1.12 | 1.11 | 1.11 | 0.00 | 1.06 | 1.04 | 1.04 | 0.57 |
| 0.00 | 0.00 | 0.44 | 0.84 | 0.71 | 15.11 | 0.00 | 18.95 | 18.52 | 15.11 |
| 0.00 | 18.15 | 18.05 | 5.43 | 5.15 | | | | | |

CURRENT DATA VALUES FROM THE SENSORS ARE AS FOLLOWS:

KINSRV(1-6)=Scaled fuel feeder speeds for speeds 1-6.

KINSRV(1) 0.6892, KINSRV(2) 0.6382, KINSRV(3) 0.6883, KINSRV(4) 0.0000, KINSRV(5) 0.6308, KINSRV(6) 0.6619

Information is based on sensor 110-RPM.

YTILTA=Position of burner tilts on A side of furnace.—28.2300°

Based on control demand signal.

YTILTB—Position of burner tilt on "B" side of furnace—6.40900°.

WCBFE=Fuel entering combustion section of furnace—93.3700.

KJAUX=Auxiliary power—18.500.

YT1SE=Throttle valve position—0.8117°.
This is an inferred value based on validated steam flow and pressure and design flow capacity of the throttle valve.
Sensors 94, 92 and others are key inputs to the calculation.

PS1SE—Steam drum pressure—2645.00 psig.
Based on sensors 100, 92 (There are 2 sensors at 92).

WT1SE—Steam flow to turbine 1 (High Pressure turbine)—866.00 #/sec.

WR1SE—Steam flow to Reheat—Radiant Reheat 22—782.01 #/sec.

PR1SE—Steam pressure entering reheat 22—456.10 psig.
Based primarily on sensor 88 and validated with information from sensors 94, 112 and others.

TS2SE—Steam Temperature entering superheat 14, pendant superheater 20—746.60° F.
Based primarily on sensors 54 (4 signals) and 104.

PS2SE—Steam pressure entering superheat 14—2575.00 psig Inferred value based on PS1SE and WT1SE.

PS1WE—Water pressure to superheat attemperator line—2761.00 psig.
Based primarily on a feed pump discharge pressure measurement-sensor 200 validated with other pressure and feedwater flow measurements such as 202, 204.

TS1WE—Temperature of attemperator spray water—310.70° F.
Based primarily on sensor 206 and validated with other feedwater temperature measurements.

TECWL—Temperature of the water leaving the economizer 61—567.90° F.
Based on four temperature measurements from sensor 62 which is validated by a logic determination.

WFWWE—Feedwater Flow rate—866.00 #/sec.
Based on WT1SE described above.

TR1SL—Steam temperature leaving radiant wall reheater 24—701.60° F.
Based on information from sensor 46 (multiple measurements).

TS2SL—Steam temperature leaving pendant superheater 18—785.90° F.
Based on information sensor 56 (multiple measurements).

TT2SE—Steam temperature entering the turbine generator 7—993.50° F.
Based on information from sensor 48 (multiple measurements).

TT1SE—Steam temperature entering turbine generator 9—1010.00° F.
Based on information from sensor 60 (multiple measurements).

TS1SL—Steam temperature leaving attemperators (after water is added)—776.10° F.
Based on information from sensor 54 (multiple measurements).

WGHWE—Water flow to glycol heaters 43—13.11 #/sec.
Based on information from sensor 210.

PECWE—Pressure of feedwater entering economizer 61—2727.00 psig.
Based on information from sensor 202 which is validated with information sensors 200, 100.

WFDHA—Air Flow thru air preheater 41—973.10 #/sec.
Inferred value based on iterative calculation.

TFDHA—Air temperature entering air preheater 41—105.50° F.
Based on information from sensor 70 (multiple measurements).

TCBSA—Air temperature leaving air preheater 41—551.50° F.
Based on information from sensor 68 (multiple measurements).

TGHWL—Water temperature leaving glycol heaters 43—142.70° F.
Based on a measurement from sensor 76.

KSPT1—Assumed throttle pressure baseline—2434.00 psig.

KSTT1—Assumed throttle temperature baseline—1010.00° F.

KSTT2—Assumed turbine generator temperature baseline—993.50° F.

MISC—Assumed average cold end temperature baseline—194.10° F.

KPCET2—Assumed condenser pressure baseline—1.50 psig.

EO2CB—Furnace exit oxygen—0.02850 #/sec.
Based on information from sensor 98 which is validated with information from sensor 102.

KHXA, B—Heat transfer coefficients determined in initialization to match validated and inferred flows and temperatures.

A = A side   1 = Water wall   5 = Radiant reheater

| B = B side | 2 = Horizontal superheater | 6 = Convective reheater |
|---|---|---|
| | 3 = Pendent superheater | 7 = Economizer |
| | 4 = Final superheater | 8 = Air preheater |

KHXA(1) 4170000.0, KHXB(1) 16610000.0, KHXA(2) 191.89999, KHXB(2) 283.70001, KHXA(3) 9.31600, KHXB(3) 26.83000, KHXA(4) 141.80000, KHXB(4) 161.80000, KHXA(5) 6.87800, KHXB(5) 16.16000, KHXA(6) 60.50000, KHXB(6) 66.17000, KHXA(7) 280.10001, KHXB(7) 486.20001, KHXA(8) 381.00000, KHXB(8) 1407.00000

WS1WE—Spray flow—42.27000 #/sec.
Based on information from sensor 104 which is validated with sensors 52 and 54.

WFDCA—Cold air (tempering) flow—112.70000 #/sec.
Based on information from sensor 220.

WCBPA—Primary air flow—256.60001 #/sec.
Inferred flow based on coal flow, cold air flow and primary air temperature from sensors 110, 220, 64.

TCBPA—Primary air temperature—182.89999° F.
Based on information from sensor 64.

YSSAR, AL, BR, BL—Spray valve position demand signals, A & B sides, left and right.
Based on control demand signals (4).
YSSAR 0.39740, YSSAL 0.67960, YSSBR 0.29130, YSSBL 0.37300

An analysis of the effect of a convergence check was performed and found to satisfy convergence criteria of blowing each section under the preceding conditions. The following information was produced:

Initially from the information provided, the model calculated a frame of reference set of conditions. The following frame of reference condition existed for the above conditions:

| NET OUTPUT | HEAT RATE | AVG TILT | SUPR HTR SPRAY | A SIDE TILT | B SIDE TILT | SOOT BLWR SECT AVG ELPS TIME |
|---|---|---|---|---|---|---|
| 464.77 | 9235.33 | 33.96 | 48.53 | 47.61 | 20.76 | 0.00 |

Thereafter the sootblower analyzer analyzed the effect of sootblowing each section and predicted the following results if the particular section is blown:

| NET OUTPUT | HEAT RATE | AVG TILT | SUPR HTR SPRAY | ΔNET OUT PUT | ΔHEAT RATE | ΔAVG TILT | ΔSUPR HTR SPRAY | A SIDE TILT | B SIDE TILT | ΔA SIDE TILT | ΔB SIDE TILT | SOOT BLWR SECT AVG ELPS TIME |
|---|---|---|---|---|---|---|---|---|---|---|---|---|
| 464.78 | 9235.21 | 36.60 | 48.65 | 0.01 | −0.12 | 2.64 | 0.12 | 51.89 | 20.77 | 4.28 | 0.01 | 29.96 |
| 464.78 | 9235.21 | 36.25 | 48.64 | 0.01 | −0.12 | 2.29 | 0.11 | 47.59 | 25.58 | −0.02 | 4.82 | 22.44 |
| 464.78 | 9235.22 | 43.65 | 48.64 | 0.01 | −0.11 | 9.70 | 0.11 | 63.06 | 20.77 | 15.46 | 0.01 | 9.13 |
| 464.78 | 9235.22 | 34.06 | 48.63 | 0.01 | −0.11 | 0.11 | 0.10 | 47.69 | 20.77 | 0.08 | 0.01 | 0.03 |
| 464.78 | 9235.22 | 49.25 | 48.61 | 0.01 | −0.11 | 15.29 | 0.08 | 47.59 | 51.15 | −0.02 | 30.39 | 15.90 |
| 464.78 | 9235.19 | 36.71 | 48.65 | 0.01 | −0.13 | 2.76 | 0.12 | 47.60 | 26.55 | −0.01 | 5.79 | 2.42 |
| 464.77 | 9235.36 | 36.85 | 48.50 | 0.00 | 0.04 | 2.89 | −0.03 | 52.40 | 20.76 | 4.80 | 0.00 | 9.36 |
| 464.78 | 9235.20 | 36.40 | 48.64 | 0.01 | −0.12 | 2.44 | 0.10 | 47.61 | 25.90 | 0.00 | 5.14 | 7.72 |
| 464.78 | 9235.08 | 36.29 | 48.75 | 0.01 | −0.25 | 2.34 | 0.22 | 51.31 | 25.57 | 3.70 | 4.81 | 9.36 |
| 464.74 | 9235.17 | 33.70 | 47.96 | −0.03 | −0.15 | −0.26 | −0.57 | 47.18 | 20.78 | −0.42 | 0.03 | 0.91 |
| 464.74 | 9235.14 | 33.70 | 47.99 | −0.03 | −0.19 | −0.26 | −0.54 | 47.62 | 19.75 | 0.01 | −1.01 | 1.16 |
| 464.74 | 9235.14 | 33.70 | 47.99 | −0.03 | −0.18 | −0.26 | −0.54 | 47.09 | 20.79 | −0.52 | 0.03 | 0.83 |
| 464.73 | 9234.98 | 33.59 | 47.77 | −0.04 | −0.35 | −0.36 | −0.76 | 47.63 | 19.55 | 0.03 | −1.21 | 1.05 |
| 464.75 | 9234.67 | 33.70 | 48.04 | −0.03 | −0.66 | −0.26 | −0.49 | 46.92 | 20.81 | −0.68 | 0.05 | 0.57 |
| 464.78 | 9235.16 | 34.07 | 48.78 | 0.01 | −0.17 | 0.11 | 0.25 | 47.59 | 20.77 | −0.01 | 0.01 | 0.00 |
| 464.71 | 9234.69 | 33.35 | 47.30 | −0.06 | −0.64 | −0.61 | −1.23 | 46.11 | 20.82 | −1.50 | 0.07 | 0.84 |
| 464.72 | 9234.43 | 33.46 | 47.55 | −0.05 | −0.90 | −0.50 | −0.98 | 47.67 | 19.80 | 0.06 | −0.96 | 0.71 |
| 464.69 | 9234.32 | 32.95 | 46.96 | −0.08 | −1.01 | −1.01 | −1.57 | 43.66 | 20.83 | −3.95 | 0.08 | 15.11 |
| 464.78 | 9235.10 | 34.05 | 48.75 | 0.01 | −0.23 | 0.09 | 0.22 | 47.59 | 20.77 | −0.01 | 0.02 | 0.00 |
| 464.93 | 9236.54 | 35.20 | 51.63 | 0.16 | 1.21 | 1.24 | 3.10 | 49.01 | 20.60 | 1.40 | −0.16 | 18.95 |
| 464.93 | 9236.54 | 35.20 | 51.63 | 0.16 | 1.21 | 1.24 | 3.10 | 47.44 | 24.37 | −0.17 | 3.61 | 18.52 |
| 464.69 | 9234.35 | 32.97 | 47.03 | −0.08 | −0.97 | −0.99 | −1.50 | 43.66 | 20.83 | −3.95 | 0.08 | 0.00 |
| 464.78 | 9235.14 | 34.05 | 48.75 | 0.01 | −0.18 | 0.09 | 0.22 | 47.59 | 20.77 | −0.02 | 0.01 | 0.00 |
| 465.01 | 9235.59 | 34.12 | 53.60 | 0.24 | 0.26 | 0.16 | 5.07 | 47.64 | 20.96 | 0.03 | 0.20 | 18.15 |
| 465.01 | 9235.59 | 34.12 | 53.60 | 0.24 | 0.27 | 0.16 | 5.07 | 47.64 | 20.96 | 0.03 | 0.20 | 18.05 |
| 464.78 | 9235.27 | 34.01 | 48.64 | 0.00 | −0.06 | 0.05 | 0.11 | 47.59 | 20.75 | −0.02 | −0.01 | 5.43 |
| 464.78 | 9235.27 | 34.01 | 48.64 | 0.00 | −0.06 | 0.05 | 0.11 | 47.59 | 20.75 | −0.02 | −0.01 | 5.15 |

The governing criteria for sootblowing is determined from burner tilt positions and superheat spray flow. In this case the governing criteria is "A" side burner tilt position high. The predicted results of sootblowing each sootblower section were then used to evaluate which section would best address the governing criteria. The following values were calculated based on the preceding predicted values:

| SCALED ADTV VALUES | SCALED ΔHEAT RATE | SCALED ΔSUPHTR SPRAY | SCALED ΔA SIDE TILT | SCALED ΔB SIDE TILT | SCALED AVG ELAPSED TIME |
|---|---|---|---|---|---|
| 0.00000 | 50.11621 | 49.55571 | 57.13467 | 50.01359 | 62.42448 |

-continued

| SCALED ADTV VALUES | SCALED ΔHEAT RATE | SCALED ΔSUPHTR SPRAY | SCALED ΔA SIDE TILT | SCALED ΔB SIDE TILT | SCALED AVG ELAPSED TIME |
|---|---|---|---|---|---|
| 0.00000 | 50.11719 | 49.61350 | 49.97228 | 58.03065 | 46.74106 |
| 0.00000 | 50.10840 | 49.61394 | 75.76148 | 50.01119 | 19.02020 |
| 0.00000 | 50.10547 | 49.62646 | 50.13940 | 50.01218 | 0.06438 |
| 0.00000 | 50.10840 | 49.69854 | 49.96602 | 100.00000 | 33.13191 |
| 0.00000 | 50.13477 | 49.57043 | 49.98220 | 59.65100 | 5.04073 |
| 0.00000 | 49.96484 | 50.11162 | 57.99300 | 49.99851 | 19.50407 |
| 0.00000 | 50.12402 | 49.62229 | 50.00477 | 58.57236 | 16.07811 |
| 0.00000 | 50.24512 | 49.19382 | 56.16602 | 58.01248 | 19.49148 |
| 7.42713 | 50.15332 | 52.05159 | 49.29656 | 50.04174 | 1.89860 |
| 0.00000 | 50.18652 | 51.93425 | 50.02259 | 48.32012 | 2.42703 |
| 8.57250 | 50.18164 | 51.94612 | 49.13404 | 50.04709 | 1.73538 |
| 0.00000 | 50.34766 | 52.74395 | 50.04573 | 47.98835 | 2.18051 |
| 13.25386 | 50.66113 | 51.77407 | 48.86330 | 50.08492 | 1.19173 |
| 0.00000 | 50.16602 | 49.09165 | 49.97578 | 50.01305 | 0.00000 |
| 28.27509 | 50.63770 | 54.44090 | 47.50445 | 50.10858 | 1.74852 |
| 0.00000 | 50.89941 | 53.51980 | 50.09868 | 48.40415 | 1.47888 |
| 100.00000 | 51.01074 | 55.66587 | 43.42237 | 50.12507 | 31.47769 |
| 0.00000 | 50.22656 | 49.20986 | 43.97729 | 50.02583 | 0.00000 |
| 0.00000 | 48.78809 | 38.83657 | 52.33894 | 49.73397 | 39.48621 |
| 0.00000 | 48.78711 | 38.82932 | 49.72099 | 56.02478 | 38.57851 |
| 0.00000 | 50.97168 | 55.40242 | 43.41899 | 50.12571 | 0.00000 |
| 0.00000 | 50.18164 | 49.22063 | 49.97457 | 50.01947 | 0.00000 |
| 0.00000 | 49.73535 | 31.74929 | 50.05424 | 50.34074 | 37.81433 |
| 0.00000 | 49.73340 | 31.75808 | 50.05168 | 50.34068 | 37.60557 |
| 0.00000 | 50.05664 | 49.60054 | 49.97399 | 49.98298 | 11.30839 |
| 0.00000 | 50.05664 | 49.59988 | 49.97399 | 49.98298 | 10.73432 |

As seen from the Scaled ADTV values, Section 18 is most beneficial and the recommended section to be blown.

These as well as the previously calculated values are displayed in various graphic forms on the operator console 260 seen in FIG. 2.

This process can also be automated.

The sootblowers are placed under the control of the DCS. A request to activate a sootblower from the computer 258 or from the operator's console 260 sends a signal through the data highway to the controller 256. The controller 256 sends a signal to the Remote I/O 252 which initiates an electrical circuit which activates the selected sootblower.

In the automation process a single sootblower is activated at a time. The sootblower section is identified by the sootblow advisor computer program described above. The functional sootblowers in this section are sequenced in order of longest elapsed time since last blown, i.e. the sootblower with longest elapsed time is blown first.

A brief inactive period follows each sootblowing action. In this period the sootblow advisor computer program may terminate the sootblowing sequence due to a change in the governing criteria.

Many obvious variations will suggest themselves to those skilled in the art in light of the above description. For example, this process can be adapted to work with other types of boilers that do not have burner tilts for reheat temperature control such as Foster Wheeler which uses gas path dampers (GPD). The process would modulate the GPD to control the reheat temperature instead of the burner tilts. Additionally, this process can be adapted to address Babcock and Wilcox systems which use reheat sprays and gas recirculation. All such variations are within the full intended scope of the invention.

We claim:

1. A process for controlling the sootblowing of a coal fired boiler-steam turbine electrical generator system having sootblowers at various locations in the combustion gas side to periodically remove soot from heat transfer surfaces, said process comprising the steps of:
   (a) obtaining current system operating data from strategically located sensors;
   (b) analyzing the data to provide a current status condition of the system;
   (c) calculating the effect of implementing various sootblowers; and
   (d) determining if implementing any of the sootblowers will have a beneficial effect on the system.

2. A process as in claim 1 comprising the step of verifying the current operating data before analyzing the data 3. A process as in claim 2 wherein the step of calculating of the effect of implementing various sootblowers is performed by
   (i) predicting the change that will occur in the system as a result of implementing each sootblower serially and
   (ii) comparing the predicted change against said current status condition of the system.

4. A process as in claim 3 wherein the step of predicting each change that will occur in the system is performed in a computer program having a model of the system, and constants, limiting criteria values and weighing factors.

5. A process as in claim 4 comprising the further step of displaying the effect of the predicted changes compared to each other in a graphic display.

6. A process as in claim 5 wherein the current system operating data obtained from strategically located sensors is comprised of temperature, pressure, flow and generator output.

7. A process as in claim 6 wherein the sootblowers are arranged in groups and sections within the groups.

8. A process as in claim 7 wherein the limiting factors and weighing factors in the computer model are a function of superheater spray, boiler firing and boiler heat rate.

9. A process as in claim 1, which further comprises the step of activating sootblowers which will have a beneficial effect on the system.

10. A process as in claim 9 wherein the step of activating the sootblowers is performed automatically.

11. An apparatus for controlling the sootblowing of a coal fired boiler-steam turbine electrical generator system having sootblowers in various locations in the combustion gas side of the boiler to periodically remove soot from heat transfer surfaces, said apparatus comprising:
(a) an assembly of sensors for obtaining current status data of the system;
(b) a plurality of means for implementing the sootblowers in the system;
(c) a computer;
(d) a computer program within the computer for calculating a frame of reference set of conditions determined by the current status data obtained by the sensors and for predicting the effect on the system that will occur if each of the plurality of means for implementing the sootblowers in the system is implemented;
(e) means for delivering the current status data from the sensors to the computer; and
(f) means for comparing each predicted sootblower implementation to determine which, if any, sootblower implementation will be most beneficial to the system.

12. An apparatus as in claim 11 further comprising means for verifying the current status data and wherein the computer model further comprises criteria values and weighing values.

13. An apparatus as in claim 11 further comprising means for automatically implementing the means implementing the sootblower in the system.

14. In a coal fired boiler-steam turbine electrical generator system having a superheat steam temperature control device, a reheat steam temperature control device, a plurality of sensors for obtaining current status data of the system, and sootblowers in various locations in the combustion as side of the boiler to periodically remove soot from heat transfer surfaces, an apparatus for evaluating, prior to actual sootblowing, the effects on the superheat steam temperature control device, reheat steam temperature control device and overall system heat rate performance which will result from implementing various sootblowers, said apparatus comprising a computer programmed to analyze status data obtained from the plurality of sensors in accordance with a predetermined model of the system in order to determine said effects of sootblowing.

15. An apparatus as in claim 14 further comprising means for determining which sootblower to activate in accordance with the evaluation of the predetermined model of the system.

16. An apparatus as in claim 15 further comprising means for adapting on-line the predetermined model of the system by incorporating therein the status data obtained from the plurality of sensors.

17. An apparatus as in claim 16 further comprising means for validating the status data obtained from the plurality of sensors prior to adapting on-line the predetermined model of the system.

18. A process for controlling the sootblowing of a coal fired boiler-steam turbine electrical generator system having sootblowers at various locations in the combustion gas side to periodically remove soot from heat transfer surfaces, said process comprising the step of applying a set of predetermined criteria to select sootblowing action appropriate to maintain a superheat steam temperature control device within a specified operating range to improve the ability to regulate superheat steam temperatures at or near a predetermined setpoint during normal and transient operations.

19. A process for controlling the sootblowing of a coal fired boiler-steam turbine electrical generator system having sootblowers at various locations in the combustion gas side to periodically remove soot from heat transfer surfaces, said process comprising the step of applying a set of predetermined criteria to select sootblowing action appropriate to maintain a reheat steam temperature control device within a specified operating range to improve the ability to regulate reheat steam temperatures at or near a predetermined setpoint during normal and transient operations.

* * * * *

UNITED STATES PATENT AND TRADEMARK OFFICE
CERTIFICATE OF CORRECTION

PATENT NO. : 5,181,482
DATED : January 26, 1993
INVENTOR(S) : Labbe et al.

It is certified that error appears in the above-indentified patent and that said Letters Patent is hereby corrected as shown below:

The title page, showing the illustrative figure, should be deleted and substitute therefor the attached title page.

IN THE DRAWINGS:

"Sheet 1 of 4" should be --Sheet 1 of 5 and after "FIGURE 1" insert --Sheet 2 of 5--, (2nd sheet of figure 1.)

Add attached FIGURE 1, Sheet 2 of 2

"Sheet 2 of 4" should read --Sheet 3 of 5--.
"Sheet 3 of 4" should read --Sheet 4 of 5--.
"Sheet 4 of 4" should read --Sheet 5 of 5--.

Column 11, claim 14, line 43, the word "as" should read -- gas --.

Signed and Sealed this

Thirtieth Day of November, 1993

Attest:

BRUCE LEHMAN

Attesting Officer

Commissioner of Patents and Trademarks

United States Patent [19]
Labbe et al.

[11] Patent Number: 5,181,482
[45] Date of Patent: Jan. 26, 1993

[54] SOOTBLOWING ADVISOR AND AUTOMATION SYSTEM

[75] Inventors: Donald E. Labbe, Woburn, Mass.; Lawrence J. Line, Davis, W. Va.; Christopher T. Geary, Sudbury, Mass.; Mark C. Leigh, Richmond, Va.; John M. Donohue, Malden, Mass.

[73] Assignee: Stone & Webster Engineering Corp., Boston, Mass. ; a part interest

[21] Appl. No.: 807,445

[22] Filed: Dec. 13, 1991

[51] Int. Cl.⁵ ............................................. F22B 37/52
[52] U.S. Cl. ................................... 122/392; 15/318.1; 122/379; 364/551.01
[58] Field of Search ............... 122/379, 390, 392, 449; 73/112; 364/551.01; 15/318.1

[56] References Cited

U.S. PATENT DOCUMENTS

| | | | |
|---|---|---|---|
| 4,085,438 | 4/1978 | Butler | 15/318.1 X |
| 4,454,840 | 6/1984 | Dziubakowski | |
| 4,466,383 | 8/1984 | Klatt et al. | 122/379 |
| 4,475,482 | 10/1984 | Moss et al. | 122/379 |
| 4,539,840 | 9/1985 | Klatt et al. | 73/112 |
| 4,718,376 | 1/1988 | Leroueil et al. | |
| 4,941,113 | 7/1990 | Dundics et al. | 364/551.01 |
| 5,027,751 | 7/1991 | Archer et al. | 122/390 X |

OTHER PUBLICATIONS

D. Labbe and M. Leigh; A Plant Controls Retrofit Using a DCS; Sep 9, 1990; St. Louis, Mo.
D. Labbe, J. Donohue and L. Line; Advanced Controls Help Cycling Plants Copy With Increased Stress; Dec. 4, 1990; Washington, D.C.

Primary Examiner—Edward G. Favors
Attorney, Agent, or Firm—Hedman, Gibson & Costigan

[57] ABSTRACT

A method and system for controlling and providing guidance in sootblowing based on continuous plant monitoring and model calculations. The continuous monitoring of plant conditions is through a plant distributed control system (DCS) which communicates with a computer. The conventional measurements of a DCS such as flow, pressure and temperature and sootblower status data are input into the computer. These valves are validated for accuracy. To predict the effects of fouling a plant model is utilized. The model predicts the rate and effect of fouling on energy distribution in the boiler. The model then predicts the effect that sootblowing of each section will have on the boiler performance. A comparison of the predicted and observed effects are used to update the fouling model and maintain consistency with the actual performance of the boiler. This information is presented to the boiler operator to assist in enhancing the boiler efficiency and maintain steam temperatures within established control ranges.

19 Claims, 4 Drawing Sheets

Microfiche Appendix Included
(233 Microfiche, 3 Pages)

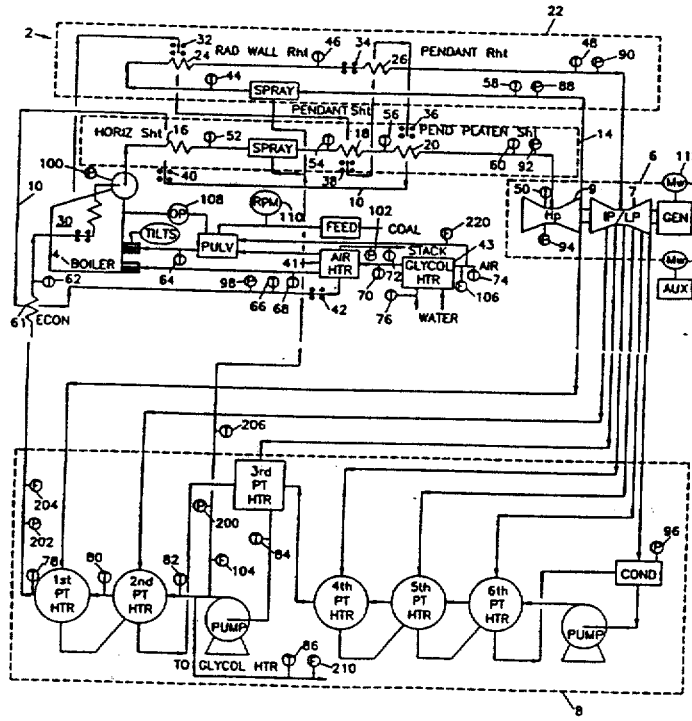

SHEET 2 OF 2